United States Patent Office 3,180,786
Patented Apr. 27, 1965

3,180,786
AMIDE-ETHER COMPOUNDS AND USE
IN INHIBITING FOAM
Elemer Domba, Chicago, and William A. Lamont, Oak
Lawn, Ill., assignors to Nalco Chemical Company, Chicago, Ill., a corporation of Delaware
No Drawing. Filed Apr. 2, 1962, Ser. No. 184,588
24 Claims. (Cl. 162—158)

This invention is concerned with new compounds and their use in inhibiting and preventing foaming problems. More particularly, the instant invention relates to amide-ether compounds and the method of inhibiting and preventing foaming particularly with regard to aqueous industrial processes.

It is known that many industrial systems are particularly susceptible to foaming problems even under mild conditions of agitation. In their more serious aspects these problems become a substantial drawback in allowing full utilization of the particular equipment involved. Also in many instances process conditions are so altered by foam that considerable interference with the process itself is caused with resultant low process capacity and considerable economic loss.

In order to counteract foaming problems it is oftentimes necessary to resort to chemical treatment in order to both abate the existing foam and prevent its reoccurrence. However, many of the chemical treatments are limited in their applications insofar as only one of the aforementioned effects takes place. That is, either immediate foam abatement occurs without continuing foam prevention, or a treatment will provide continuous foam protection but is of no great use in dissipating already formed foam. Therefore, in many instances it is necessary to resort to at least two specific chemicals in order to achieve both foam abatement and foam inhibition in a system under treatment.

Another serious disadvantage of prior art antifoam compositions is their inability to be applied generally in a wide variety of industrial systems and processes. Resort to multi-component treatments in order to achieve the required scope of activity leads to problems such as dispersibility of the compounds both in each other and in the particular system to be controlled. In addition, costly time and manpower must be spent in compounding these multi-component antifoam treating compositons.

Many other disadvantages are involved in the use of prior art antifoam treatments. Some of these substances break down both chemically and physically, causing even greater foaming problems due to the foam encouraging properties of the products of degradation. Other antifoam compositions cannot be employed in certain areas due to the fact that they are quickly distilled by heat from the area which needs control or have little or no dispersibility, much less permanent dispersibility in the medium to be treated.

Lastly, many defoaming or foam-inhibiting substances must be employed in relatively large amounts to give effective control or else cause difficult process control problems because they are ineffective unless added in certain critical amounts.

It would be, therefore, a beneficial advance in the antifoaming art if a single substance could be found which is relatively general in its application, has good chemical and physical stability, excellent dispersibility or solubility in the environment to be treated, and yet need only be applied in relatively low amounts to give effective control. It would be an extreme advantage to the art if a substance could be employed particularly in troublesome aqueous systems which have a strong tendency to foam, such as the various systems used in processing paper pulp and the like.

It therefore becomes an object of the invention to provide stable, easily-dispersible antifoam compounds which have rather general application without recourse to other antifoam aids.

Another object of the invention is to provide novel compositions of matter having both an amide and ether grouping as an essential portion of the molecule, which substances may be used in antifoam processes involving simultaneous defoaming and foam inhibition action.

A specific object of the invention is to provide amide-ether compounds which may be dispersed in an aliphatic hydrocarbon oil for subsequent use as an antifoam composition in aqueous systems susceptible to foaming problems, as illustrated in paper mill applications.

Another specific object of the invention is to provide a process of inhibiting and preventing foaming in systems, and particularly aqueous systems which normally tend to be foamable, by addition of new amide-ether compounds having specific ascertainable molecular configurations.

In accordance with the invention a novel class of amide-ether compounds have been discovered which are admirably suited for use in defoaming and foam inhibition activities. These new compounds may be used as antifoam agents without resort to a combination with other ingredients, and may be used in a wide variety of industrial processes which are accompanied by foaming problems. In general, the amide-ether compounds fall within the following structural formula:

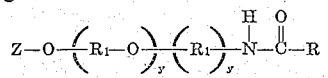

where Z is a monovalent acyclic organic radical containing a member selected from the group consisting of carbonyl, carbamyl, hydrogen, oxygenated phosphorus, and halogenated aliphatic carbonyl, R is a monovalent acyclic organic radical containing from 7 to 21 carbon atoms, $R_1$ is a divalent lower alkylene radical and $y$ is an integer of from 1 to 3.

The above compounds find use both as defoaming agents, that is, in abating a system already in a foaming state or in inhibiting or preventing foam formation before such a condition occurs. Both roles, of course, may be performed simultaneously.

According to the choice of the chemist, the above amide-ether compounds falling within the defined structural formula may be synthesized through a wide variety of known organic synthetic routes. In a preferred practice, however, the following general method may be carried out in order to synthesize the amide-ether compounds of the invention.

As the starting base materials upon which are built the compounds of the invention, it is preferred that alkanol amines be used as base molecules. Such hydroxy amines as the following are illustrative: $HOCH_2NH_2$,

The next general sequence of reaction is the combination of the above-type alkanol amines with varying amounts of such compounds as ethylene oxide and propylene oxide to produce at least one ether linkage in the molecule by condensation of the ethylene or propylene oxide upon the hydroxy group of the alkanol amine. In order to obtain the desired condensation in the hydroxyl group it is desired to block off the reactivity of the amine through salt formation and the like. The reaction product of the ethoxylation or propoxylation reaction is then subjected to an amidifiaction step wherein the amine group is amidified by reaction with a fatty acid.

The last step in the general synthesis is reaction of the terminal hydroxyl group of the amide-ether compound with the desired reagents in order to produce a monovalent acyclic organic radical of the type defined. This last reaction step may be generically defined as an esterification in the preferred practice. That is to say while the above defined requisite members in the monovalent acyclic organic radical, "Z," may be anywhere in the molecule, it is greatly preferred that these members be attached to the final ether linkage constituting in effect therefore an ester group in toto. The terminal hydroxyl group therefore may be reacted with carboxylic acids, carbamyl producing reagents, phosphoric acids and halogenated carboxylic acids.

For purposes of antifoam activity the following general reactions with the terminal hydroxyl group are preferred in order to produce the compounds of the invention containing a requisite member of the above defined monovalent acyclic organic radical, "Z." If Z contains a carbonyl group it is preferred that this carbonyl group be directly attached to the ether linkage forming an ester group.

The terminal hydroxyl group may be esterified with a wide variety of monocarboxylic acids, but is preferred that these acids be of the fatty acid type containing from 8 to 22 carbon atoms. More preferably, these acids should contain from 12 to 22 carbon atoms. These fatty acid esterifying agents may be saturated or unsaturated. Illustrative of the saturated fatty acids are capric, lauric, myristic, palmitic, stearic and behenic. Unsaturated fatty acids used as esterifying agents include lauroleic, oleic, palmitoleic, myristoleic, linoleic, linolenic and the like. The fatty acids used as esterifying agents may also be chosen from naturally-occurring sources in which a mixture of saturated and unsaturated fatty acids varying in their carbon content may be involved. For example, tallow, hydrogenated tallow, castor oil, palm oil, coconut oil, cotton-seed oil, and the like may be employed as sources of esterifying agents. These natural sources vary widely as to their number and type of fatty acid constituents which go up to make the mixture. However, each of their fatty acid constituents falls within the scope of the invention and are particularly suited for use due to their low cost and availability.

If Z contains a carbamyl member it is greatly preferred that Z itself be a carbamyl radical, which when attached to the ether oxygen comprises in effect a carbamate group. This group may be conveniently formed by reaction of the terminal hydroxide with any source of carbamic acid produced in situ or by addition of the requisite agent.

Where Z contains a hydrogen member, it is greatly preferred that gain Z by comprised entirely of this member. Therefore, after the alkanol amine has been ethoxylated or propoxylated leaving a terminal hydroxyl group, no further reaction is necessary in order to produce this particular class of compounds forming one of the sub-genuses of the invention.

When Z contains an oxygenated phosphorus group it is again greatly preferred that this oxygenated phosphorus group be itself the sole constituent of Z. The most convenient way of preparing this class of compounds is to react the terminal hydroxide group of the amide-ether compound with an inorganic phosphorus-containing acidic compound. Among these are hydrophosphorus acid, phosphorus acid, metaphosphorus acid, hypophosphoric acid, phosphoric acid, metaphosphoric acid, and pyrophosphoric acid. The most preferred of the phosphorus-containing acids is orthophosphoric acid, the normal tribasic acid of pentavalent phosphorus.

When Z contains a halogenated aliphatic carbonyl member it is preferred that these classes of compounds be produced by reacting halogenated monocarboxylic acids with the terminal hydroxyl group of the amide-ether compound. The halogenated monocarboxylic acids may contain one or more halogen groups on any of the carbon atoms adjacent to the terminal carboxyl group. Again, when the halogenated aliphatic carboxylic acid is reacted with the terminal hydroxyl group the carbonyl group ends up adjacent to the ether linkage and forms an ester group, with the remaining portion of the molecule containing the halogen atoms, being the residue of the starting carboxylic acid employed.

Referring again to the general structural formula, it has been found that R may be varied from 7 to 21 carbon atoms in length and more preferably from 11 to 21 carbon atoms. R, of course, is the residue of the monocarboxylic fatty acid which carboxylic acid group has been reacted with the primary amino group of the alkanol-amine compound to produce the amide thereof. It is greatly preferred that these amides be synthesized by reacting monocarboxylic fatty acid materials with the amino group. The same type of fatty acids as listed above may be used in this amidification reaction including both saturated and unsaturated fatty acids and mixtures thereof from impure natural sources. This amidification reaction, as a well-known chemical reaction, may be carried out by simply heating the alkanol amine with the fatty acid at temperatures sufficient to split off a molecule of water during the condensation of the reactants. This amidfication reaction may take place with or without a solvent and with or without an azeotropic type distillation technique. When the same type of radical is desired on both ends of the alkanol amine the amidification and esterification reactions may be accomplished simultaneously by reaction of the terminal groups of the alkanol amine with the requisite number of moles of fatty acid.

Again with reference to the general structure formula, $R_1$ is a divalent lower alkylene radical. Among the preferred alkylene radicals the following are illustrative:

$$-CH_2-, -CH_2CH_2-, \text{ and } CH_2CH_2CH_2-$$

$y$ as an integer in the structural formula, may be varied from 1 to 3 depending upon the particular alkanol amine which is employed as the starting material and/or the number of moles of ethylene or propylene oxide added to the starting alkanol amine. The number of ether linkages attached to the divalent lower alkaline radical as defined by $y$, or the number of divalent lower alkaline radicals attached to said ether linkages and the amido nitrogen, may be varied from 1 to 3 and may differ one from the other as to their number of repeating units.

It is obvious to those skilled in the art that the amide-ether compounds of the type illustrated above may be synthesized by different sequential steps and/or different reactants without departing from the spirit of the invention. When the above type amide-ether compounds are used as foam inhibitors and foam preventers, they may be used as such without any further compounding or modification. However, in order to treat certain systems more effectively, it is preferred that the amide-ether compounds be dispersed in an aliphatic hydrocarbon oil. The resultant composition is more readily available for dispersion into the system to be treated and in particular is more suited for treatment of aqueous systems such as those encountered in the paper and pulp industry.

The aliphatic hydrocarbon oils used in the preparation of the defoaming compositions are all hydrophobic in nature. The role of these oils is essentially that of an extender for the amide-ether antifoam compounds. Included in this group of extenders are such aliphatic hydrocarbon oils as mineral seal oil, kerosene, various light aliphatic fuel oils, gas oils, paraffin waxes, and the like. Of these, mineral seal oil gives the most superior formulation due to its relatively low cost and excellent action in dispersing the amide-ether compounds.

In many instances the formulation of aliphatic hydrocarbon oil and amide-ether compounds is simplified by incorporating a minor amount of an emulsifying agent, several types of which are illustrated in the publication "Synthetic Detergents, Up To Date," by John T. McCutcheon, Soap and Sanitary Chemicals, July, August, Stepember and October 1952. Polyoxyethylene glycol the product washed and dried. This product has the following structural formula:

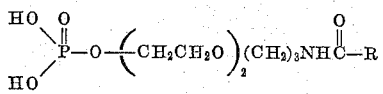

where R is primarily $C_{17}H_{35}$.

*Example VIII*

To one mole of the product of Example V was added one mole of urea. These reactants were heated for 3½ hours at 160° C. in a 500 ml. resin flask equipped with a stirring device and heater attached to a variable transformer. After this time the product was removed yielding a carbamate ester having the following structural formula:

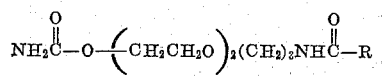

where R is primarily $C_{17}H_{35}$.

EVALUATION OF THE INVENTION

Two laboratory test methods were employed in order to evaluate the compounds of the invention. The first was designated as the "dynamic antifoam test" which indicates the ability of the antifoam to prevent foam formation in the liquid portion of the paper stock. The second was "the recirculating test" which gives an indication of the ability of the antifoam to deaerate the paper stock. The details of these tests are as follows:

DYNAMIC ANTIFOAM TEST

This test was performed as follows: 200 mls. of filter paper stock were placed in a 2" glass column 30" high, fitted with a bottom stopper and an air sparger. Air was then introduced through the sparger into the paper stock solution. A dosage of antifoam required to prevent foam build-up during aeration is then determined. Test stocks for this particular test were prepared as follows:

To 860 mls. of water containing 224 mg. calcium chloride were added 140 grams of 16% total solids black liquor and 50 mls. of a 1% aqueous solution of a sodium salt of rosin acid. 58 mls. of this solution were then added to a one-gallon jug. 18 grams of kraft pulp were then pulped in 1,000 mls. of water and added to the jug containing the black liquor mixture. Stock was then made up to one gallon with tap water, well shaken and the pulp filtered off with a 40-mesh screen. The filtered stock was then used for the dynamic antifoam test.

RECIRCULATING TEST

In this test 400 mls. of a paper stock containing pulp were placed in a glass tube 3.5" in diameter and 9.5" in height. By means of a pump the stock was circulated throughout the tube and the amount of antifoam necessary to prevent foam build-up during recirculation was then determined. More complete details of this method of evaluation of antifoam compositions in paper stock will be found in U.S. Patent No. 2,849,405.

The stock for the recirculation test above was prepared in the same manner as the dynamic test stock with the exception that the pulp was not filtered off.

All the compositions of Examples I–VIII were tested for antifoam activity in both the recirculation and dynamic antifoam tests. In all cases these products had excellent activity in preventing and inhibiting foam build-up and in deaerating the paper stock, within the aforementioned limits of chemical application per ton of paper stock. With regard to the circulation test, it was determined that the products synthesized in the preceding examples prevented foam build-up by application of between 0.1 pound of chemical per ton of pulp and 2.0 pounds per ton.

In all instances the products were also formulated with mineral oil by adding 6 parts of the active compounds of Examples I–VIII with three parts of a polyglycol oleate emulsifier and 20 parts of mineral seal oil. This mixture was heated until clear and 80 parts of unheated mineral seal oil were added to the hot clear mixture with stirring. The resultant composition was extremely useful in inhibiting and preventing foam with concurrent excellent dispersability, especially in industrial systems involving paper pulp. It must be pointed out that the mineral seal oil itself had absolutely no activity in preventing and inhibiting foam. As previously mentioned, it acts merely as an extender and dispersant aid rather than as a promoter for the active amide-ether antifoam compositions.

In order to compare the above laboratory results with actual field conditions a series of tests in various paper mills were run with several of the above compounds. These compounds were applied at various places throughout the paper-making process and particularly where serious foaming problems arose. The following examples are illustrative of the type field tests which were run involving the amide-ether compositions of the invention. In all examples the 6% solution of the active antifoam ingredient in mineral seal oil was employed.

*Example IX*

The active amide-ether compound of Example II incorporated in mineral seal oil was fed into the launder ring of the chlorination cell of a sulfite mill processing pulp from spruce and balsam. The compound showed excellent activity when compared to a conventional fatty acid ester-type antifoam with the vat level in the chlorine-washing stage dropping an additional 6"–7" after the application of the amide-ether composition of the invention.

*Example X*

The same composition used in Example IX was run in a de-inking mill which had a particularly difficult problem in a chlorine Oliver and on the flat reject screens following the Cowan A Screens. The amide-ether composition was fed to the Cowan discharge going to the chlorine Oliver. In addition to superior results when compared to a conventional antifoam composition it was found that the amide-ether composition of the invention had no deleterious effect on stock brightness whereas the competitive sample dropped the brightness by 0.5–1.0 point.

*Example XI*

Again the composition of Example II incorporated in mineral seal oil was employed, this time in a chemical-groundwood mill. Here, the sample was run in the screen room and fed to the effluent from the washer. Compared to a competitive product, the control of foam was definitely improved at all points in the system where the surface of white water could be observed, such as the seal tank following the thickener, and at the white water chest below the decker.

*Example XII*

In this example the composition of Example II dispersed in mineral seal oil was employed as a defoaming and foam inhibitor agent in the decker of a kraft pulp mill. In this mill control of a 6% dispersion of the amide-ether composition in mineral seal oil was good at a dosage of 20–25 cc. per minute. A competitive material employed in the same manner and fed to the decker in the same way took 30–35 cc. per minute in order to give a control equal to the composition of the invention. Even more important, the ester-amide-ether composition did not deposit solids throughout any part of the system whereas the competitive material deposited deleterious solids in many areas.

*Example XIII*

The antifoam composition of Example II was employed in this example in a large waste disposal plant. When directly compared to the competitive material it was detertypes and polyalkylene glycols such as "Ucons" and "Carbowaxes" marketed by Carbide and Carbon Chemicals Corporation are examples of such emulsifiers.

Typical compositions useful as antifoams involving amide-ether compounds and aliphatic hydrocarbon oils, or amide-ether compounds, aliphatic hydrocarbon oils and emulsifiers are as follows.

TABLE I

| Compound: | Parts by weight |
|---|---|
| Amide-ether compound | 1–25 |
| Aliphatic hydrocarbon oil | 75–99 |

TABLE II

| Compound: | Parts by weight |
|---|---|
| Amide-ether compound | 1–25 |
| Aliphatic hydrocarbon oil | 65–98.9 |
| Emulsifier | 0.1–10 |

As mentioned above, the amide-ether compounds are useful in a wide variety of industrial processes which require control of foaming problems. Among these processes the amide-ether compounds may be used in the following: in the feedwater of boilers such as wayside boilers, for use in non-frothing emulsions used in leather tanning, textile industry, etc., in cutting oils, for incorporation into dye baths, dye paste, discharge paste and the like, to prevent foaming and resultant loss of liquid from a circulating cooling system, in fermentation processes, in cooking with fats and oils, in lubricants, in single or multiple-effect concentrators containing aqueous, organic or inorganic type materials and the like. Besides use in the above varied processes involving a wide variety of environmental conditions, the amide-ether compounds of the invention are particularly useful in controlling foam in pulp and paper manufacture such as in the kraft process where many oil based antifoams are relatively ineffective. The amide-ether compounds are effective over a wide range of pH conditions and under almost any combination of pressure and temperature conditions. The compounds when used as antifoam agents should be preferably added as close as possible to the source of the foam. For example, in the papermaking operation, since foaming difficulties occur on the screen boxes and the cylinders of a cylindrical papermaking machine or in the headbox of a Fourdrinier papermaking machine it is preferred that antifoam application be made there. The antifoam amide-ether compounds may also be added to the feed or the screen pump, screens, or showers of the cylinder machine, or to the fan pump, showers or wire pit of the Fourdrinier machine. The amide-ether antifoams of the invention are easily and accurately proportioned into the foaming media and rapidly disperse in the aqueous system so as to produce fast foam elimination.

When used for antifoam control of pulp and paper manufacture, as little as ¼ pound of active antifoam per ton of pulp based on the weight of the dry fiber gives good results, and as high as 20 pounds per ton may be used in extremely difficult foaming areas. In a preferred practice between ¼ and 2 pounds of chemical are used per ton of fiber stock.

When used in other areas outside of the papermaking industry, addition of as little as one part per million of the amide-ether compound gives good foam inhibition and foam prevention. As much as 500 parts per million of antifoam may be used but a preferred range is between 1 and 100 parts per million, with the most preferred range being 1–25 p.p.m.

The following examples illustrate certain preferred amide-ether compounds of the invention and the preparative techniques involved in synthesizing same. The invention, of course, is not limited by the following examples which are meant to be merely illustrative of the type of compounds falling within the scope of the invention as defined by the general structural formula above.

*Example I*

A 500 ml., 3-neck reaction flask was fitted with a heater connected to a variable transformer, a stirring device, a condenser attached to a Dean and Stark trap, and a thermometer. To this flask was added one mole of the diethylene glycol ether of n-propanol amine and two moles of split saturated tallow acid (primarily stearic acid with minor amounts of lower saturated and unsaturated acids). The above reactants were dissolved in about 200 mls. of toluene and refluxed for about four hours. The water created by condensation of the reactants in forming simultaneously the glycol amine molecule, was removed by means of the Dean and Stark trap. The resultant product designated as Composition I had the following structural formula:

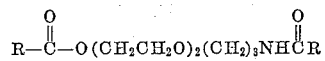

where R is primarily $C_{17}H_{35}$.

*Example II*

In this example the product of Example I was again prepared but without resort to azeotropic distillation in toluene. In this example 21.94% of the polyglycolamine and 78.06% of the saturated tallow acid were heated at 140° C.–160° C. under a medium vacuum until an acid value of 30 was reached.

*Example III*

This example was run in accordance with the procedure of Example II with the exception that pure oleic acid was used as the combination esterifying-amidifying reagent.

*Example IV*

This example was run in accordance with the procedure outlined in Eaxmple II except that two moles of behenic acid was used in the combination with one mole of the polyglycolamine.

*Example V*

This example was run according to the general procedure outlined in Example II except that the tallow acid and polyglycolamine were reacted in a mole-to-mole basis. Under these reaction conditions and since the amino portion of the polyglycolamine is more amenable to reaction, only the amide is formed leaving the terminal hydroxide portion of the polyglycolamine free for subsequent reaction. Infra-red spectrum and other chemical data have shown that when only one mole of a fatty acid is added to the polyglycolamine substantially all amide is obtained to the exclusion of ester formation.

*Example VI*

To one mole of the amide-ether compound of Example V containing a terminal hydroxide group was added 1.1 moles of trifloro acetic acid. The reactants were refluxed in benzene for six hours, after which time the benzene and excess trifloro acetic acid were removed by distillation yielding a waxy product having the following structural formula:

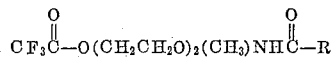

where R is primarily $C_{17}H_{35}$.

*Example VII*

One mole of the amide-ether composition of Example V was added to 1.1 moles of orthophosphoric acid. The reactants were refluxed in xylene with a trace of p-toluene sulfonic acid as a catalyst. The theoretical amount of water, that is, one mole was removed, after which time the xylene was distilled from the reaction system and mined that the amide-ether-ester composition of Example II fed at a rate half that of the competitive product and killed the foam twice as fast, giving in effect a four-fold increase in efficiency.

*Example XIV*

A 6% concentration of Composition II in mineral seal oil was employed as an antifoam agent in sewers and in the river at point of sewer discharge of a kraft mill. The sewers carried a combination of wash waters from chlorination, caustic stage, etc. The composition of the invention performed a better job than any competitive material employed to date.

Many of the other compositions as particularly set forth in the foregoing examples gave comparable results with the composition of Example II in various paper and pulp processing systems.

Other compositions of the invention involving different alkanol amine starting materials were also tested for antifoam activity and showed as good activities as specifically enumerated in the above examples not only in the area of paper mill application but in other aqueous and non-aqueous systems as previously enumerated.

It is apparent that other compounds such as emulsifiers, extenders, dispersants and the like may be added to the amide-ether compositions of the invention in order to obtain products of the desired physical characteristics or to overcome feeding problems and the like.

Having thus described our invention it is claimed as follows:

1. A new composition of matter useful in defoaming and inhibiting foam formation which comprises an amide-ether compound having the following structural formula:

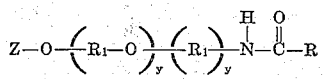

where Z is a monovalent acyclic organic radical containing a member selected from the group consisting of carbonyl, carbamyl, hydrogen, oxygenated phosphorous, and halogenated aliphatic carbonyl, R is a monovalent acyclic organic radical containing from 7 to 21 carbon atoms, $R_1$ is a divalent lower alkylene radical selected from the group consisting of $CH_2$, $CH_2CH_2$, and $CH_2CH_2CH_2$ and $y$ is an integer of from 1 to 3.

2. The composition of claim 1 where Z is hydrogen and R is a saturated monovalent acyclic organic radical containing from 11 to 21 carbon atoms.

3. The composition of claim 1 where Z is

X represents a halogen atom and R is a monovalent saturated acyclic radical containing from 11 to 21 carbon atoms.

4. The composition of claim 1 wherein Z is

and R in both occurrences is a saturated monovalent acyclic organic radical containing from 11 to 21 carbon atoms.

5. The composition of claim 1 wherein Z is

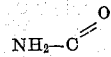

and R is a saturated monovalent acyclic organic radical containing from 11 to 21 carbon atoms.

6. The composition of claim 1 wherein Z is

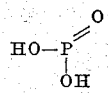

and R is a saturated monovalent acyclic organic radical containing from 11 to 21 carbon atoms.

7. A new composition of matter useful in defoaming and inhibiting foam formation which comprises an amide-ether compound having the following chemical structure:

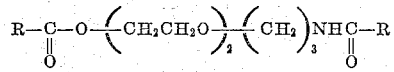

where R is a monovalent acyclic radical ranging in carbon content from $C_{11}$–$C_{21}$.

8. A new composition of matter useful in defoaming and inhibiting foam formation which comprises an amide-ether compound having the following chemical structure:

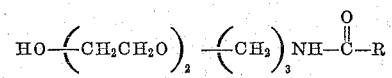

where R is an acyclic hydrocarbon radical containing from 11 to 21 carbon atoms.

9. A new composition of matter useful in defoaming and inhibiting foam formation which comprises an amide ether compound having the following chemical structure:

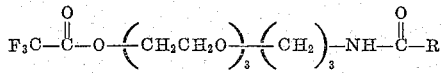

where R is an acyclic hydrocarbon radical containing from 11 to 21 carbon atoms.

10. A new composition of matter useful in defoaming and inhibiting foam formation which comprises an amide-ether compound having the following chemical structure:

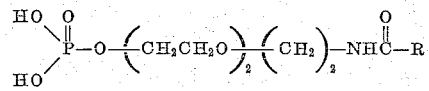

where R is an acyclic hydrocarbon radical containing from 11 to 21 carbon atoms.

11. A new composition of matter useful in defoaming and inhibiting foam formation which comprises an amide-ether compound having the following chemical structure:

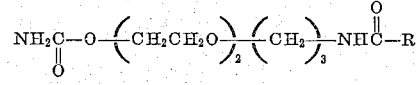

where R is an acyclic hydrocarbon containing from 11 to 21 carbon atoms.

12. A new composition of matter useful in defoaming and inhibiting foam formation which comprises:

(A) 1–25 parts of an amide-ether compound having the following general structural formula:

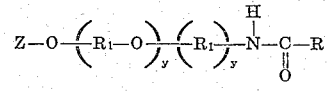

where Z is a monovalent acyclic organic radical containing at least a group selected from the class consisting of carbonyl, carbamyl, hydrogen, oxygenated phosphorus, and halogenated aliphatic carbonyl, R is a monovalent acyclic organic radical containing from 7 to 21 carbon atoms, $R_1$ is a divalent lower alkylene radical selected from the group consisting of $CH_2$, $CH_2CH_2$, and $CH_2CH_2CH_2$ and $y$ is an integer of from 1 to 3;

(B) 75–99 parts of an aliphatic hydrocarbon oil.

13. The composition of claim 12 wherein the amide-ether compound is:

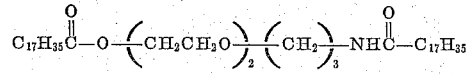

and the aliphatic hydrocarbon is mineral seal oil.

14. A new composition of matter useful in defoaming inhibiting foam formation which comprises:

(A) 1–25 parts of an amide-ether compound having the following general structural formula:

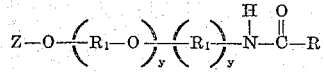

where Z is a monovalent acylic organic radical containing at least a group selected from the class consisting of carbonyl, carbamyl, hydrogen, oxygenated phosphorus, and halogenated aliphatic carbonyl, R is a monovalent acylic organic radical containing from 7 to 21 carbon atoms, $R_1$ is a divalent lower alkylene radical selected from the group consisting of $CH_2$, $CH_2CH_2$, and $CH_2CH_2CH_2$ and $y$ is an integer from 1 to 3;

(B) 65—98.9 parts of an aliphatic hydrocarbno oil, and;

(C) 0.1–10 parts by weight of an emulsifier.

15. The process of defoaming and inhibiting foam formation in a system which normally tends to be foamable which comprises the step of adding to such system an amide-ether compound in an amount sufficient to control said foam, said compound having the general structural formula:

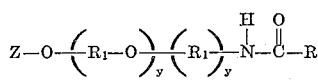

where Z is a monovalent acylic organic radical containing at least a group selected from the class consisting of carbonyl, carbamyl, hydrogen, oxygenated phosphorus, and halogenated aliphatic carbonyl, R is a monovalent acylic organic radical containing from 7 to 21 carbon atoms, $R_1$ is a divalent lower alkylene radical selected from the group consisting of $CH_2$, $CH_2CH$, and $$CH_2CH_2CH_2$$

and $y$ is an integer of from 1 to 3.

16. The process of claim 15 wherein the amide-ether compound is:

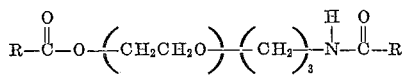

where R is an acylic hydrocarbon radical containing from 11 to 21 carbon atoms.

17. The process of defoaming and inhibiting foam formation in a system which normally tends to be foamable which comprises the step of adding to such system at least 1 p.p.m. of an antifoam composition which comprises:

(A) 1–25 parts by weight of an amide-ether compound having the following general structural formula:

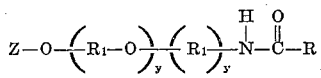

where Z is a monovalent acylic organic radical containing at least a group selected from the class consisting of carbonyl, carbamyl, hydrogen, oxygenated phosphorus, and halogenated aliphatic carbonyl, R is a monovalent acylic organic radical containing from 7 to 21 carbon atoms, $R_1$ is a divalent lower alkylene radical selected from the group consisting of $CH_2$, $CH_2CH_2$, and $CH_2CH_2CH_2$ and $y$ is an integer of from 1 to 3;

(B) 75–99 parts by weight of an aliphatic hydrocarbon oil.

18. The process of claim 17 wherein the amide-ether compound is:

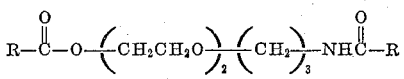

where R is an acylic hydrocarbon radical containing from 11 to 21 carbon atoms, and the aliphatic hydrocarbon oil is mineral seal oil.

19. The process of defoaming and inhibiting foam formation in an aqueous system containing cellulosic pulped fibers, which system normally tends to be foamable, which comprises the step of adding to said aqueous system an amide-ether compound in an amount sufficient to control said foam, said compound having the following general structural formula:

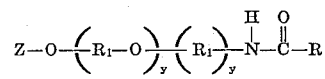

where Z is a monovalent acylic organic radical containing at least a group selected from the class consisting of carbonyl, carbamyl, hydrogen, oxygenated phosphorus, and halogenated aliphatic carbonyl, R is a monovalent acylic organic radical containing from 7 to 21 carbon atoms, $R_1$ is a divalent lower alkylene radical selected from the group consisting of $CH_2$, $CH_2CH_2$, and $$CH_2CH_2CH_2$$

and $y$ is an integer of from 1 to 3.

20. The process of claim 19 wherein the amide-ether compound is:

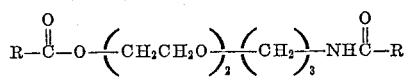

where R is an acylic hydrocarbon radical containing from 11 to 21 carbon atoms.

21. The process of defoaming and inhibiting foam formation in an aqueous system containing cellulosic pulped fibers, which system normally tends to be foamable, which comprises the step of adding to said system at least ¼ pound per ton of pulp of an antifoam composition which comprises:

(A) 1–25 parts by weight of an amide-ether compound, said compound having the following general structural formula:

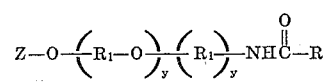

where Z is a monovalent acyclic organic radical containing at least a group selected from the class consisting of carbonyl, carbamyl, hydrogen, oxygenated phosphorus, and halogenated aliphatic carbonyl, R is a monovalent acyclic organic radical containing from 7 to 21 carbon atoms, $R_1$ is a divalent lower alkylene radical selected from the group consisting of $CH_2$, $CH_2CH_2$, and $CH_2CH_2CH_2$ and $y$ is an integer of from 1 to 3;

(B) 25–99 parts by weight of an aliphatic hydrocarbon oil.

22. The process of claim 21 wherein said amide-ether compound is:

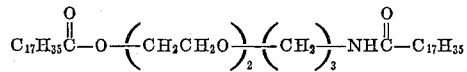

and said aliphatic hydrocarbon oil is mineral seal oil, said composition being added to said cellulosic pulp fibers in an amount between about ¼ and 2 pounds per ton of pulp.

23. The process of defoaming and inhibiting foam formation in an aqueous system containing cellulosic pulp fibers, which system normally tends to be foamable, which comprises the step of adding to said system an antifoam composition in an amount between about ¼ and 2 pounds per ton of pulp, said antifoam composition comprising:

(A) 1–25 parts by weight of an amide-ether compound, said compound having the following general structural formula:

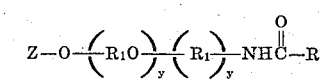

where Z is a monovalent acyclic organic radical containing at least a group selected from the class consisting of carbamyl, hydrogen, oxygenated phosphorus, amide, ester and halogenated aliphatic carbonyl, R is a monovalent acyclic organic radical containing from 7 to 21 carbon atoms, $R_1$ is a divalent lower alkylene radical selected from the group consisting of $CH_2$, $CH_2CH_2$, and $CH_2CH_2CH_2$ and y is an integer of from 1 to 3;
(B) 0.1–10 parts by weight of an emulsifier;
(C) 65–98 parts of an aliphatic hydrocarbon oil.
24. The process of claim 23 wherein said amide-ether compound is:

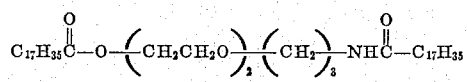

and said aliphatic hydrocarbon oil is mineral seal oil.

References Cited by the Examiner
UNITED STATES PATENTS

| | | | |
|---|---|---|---|
| 2,493,453 | 9/50 | Gunderson | 252—321 |
| 2,695,916 | 11/54 | Groote | 252—358 |
| 2,748,089 | 5/56 | Monson | 252—358 |

FOREIGN PATENTS 658,494  10/10  Great Britain.

DONALL H. SYLVESTER, *Primary Examiner.*
MORRIS O. WOLK, *Examiner.*

UNITED STATES PATENT OFFICE
CERTIFICATE OF CORRECTION

Patent No. 3,180,786                                April 27, 1965

Elemer Domba et al.

It is hereby certified that error appears in the above numbered patent requiring correction and that the said Letters Patent should read as corrected below.

Column 3, line 49, for "gain Z by" read -- again Z be --; line 72, for "The" read -- These --; column 11, line 10, for "hydrocarbno" read -- hydrocarbon --; same column 11, lines 1, 22, 26, 38, 51, 55 and 68, and column 12, lines 6, 10, and 22, for "acylic", each occurrence, read -- acyclic --.

Signed and sealed this 2nd day of November 1965.

(SEAL)
Attest:

ERNEST W. SWIDER                            EDWARD J. BRENNER
Attesting Officer                                  Commissioner of Patents